(12) United States Patent
Meister et al.

(10) Patent No.: US 6,363,706 B1
(45) Date of Patent: Apr. 2, 2002

(54) APPARATUS AND METHOD TO INCREASE TURBINE POWER

(75) Inventors: Kurt Meister, Rio Rancho; E. Scott Wright, Placitas, both of NM (US)

(73) Assignee: AlliedSignal, Morristown, NJ (US)

( * ) Notice: Subject to any disclaimer, the term of this patent is extended or adjusted under 35 U.S.C. 154(b) by 0 days.

(21) Appl. No.: 09/466,342

(22) Filed: Dec. 17, 1999

Related U.S. Application Data

(60) Provisional application No. 60/113,851, filed on Dec. 24, 1998.

(51) Int. Cl.⁷ .............................. F02G 3/00; F02C 3/00
(52) U.S. Cl. ...................................... 60/39.02
(58) Field of Search ................. 60/39.511, 39.142, 60/39.141, 728, 726, 39.161; 415/179, 119.6

(56) References Cited

U.S. PATENT DOCUMENTS

| | | |
|---|---|---|
| 3,819,233 A | 6/1974 | Barnard |
| 3,892,499 A | 7/1975 | Strub |
| 4,147,026 A | 4/1979 | Weiler |
| 4,244,191 A | 1/1981 | Hendriks |
| 4,301,649 A | 11/1981 | Walker |
| 4,369,630 A | 1/1983 | Bloomfield |
| 4,569,195 A | 2/1986 | Johnson |
| 4,592,204 A | 6/1986 | Rice |
| 4,660,376 A | 4/1987 | Johnson |
| 4,678,398 A * | 7/1987 | Dodge et al. ............... 415/181 |
| 4,872,307 A | 10/1989 | Nakhamkin |
| 4,896,499 A | 1/1990 | Rice |
| 4,949,544 A | 8/1990 | Hines |
| 5,094,069 A | 3/1992 | Boffo |
| 5,133,180 A | 7/1992 | Horner |
| B14,896,499 A | 9/1992 | Rice |
| 5,163,285 A | 11/1992 | Mazeaud |
| 5,319,925 A | 6/1994 | Hendriks |
| 5,513,488 A * | 5/1996 | Fan .......................... 60/39.05 |
| 5,553,448 A * | 9/1996 | Farrell et al. ............ 60/39.161 |
| 5,564,898 A | 10/1996 | Richards |
| 5,593,165 A | 1/1997 | Murray |
| 5,626,018 A | 5/1997 | Hatfield |
| 5,669,217 A | 9/1997 | Anderson |
| 5,724,806 A | 3/1998 | Horner |
| 6,107,693 A * | 8/2000 | Mongia et al. ............... 290/52 |

FOREIGN PATENT DOCUMENTS

| | | |
|---|---|---|
| EP | 0348676 A | 1/1990 |
| EP | 0444913 A | 9/1991 |
| GB | 791240 A | 2/1958 |

* cited by examiner

*Primary Examiner*—Charles G. Freay
*Assistant Examiner*—W Rodriguez
(74) *Attorney, Agent, or Firm*—Ephraim Starr; DeWitt M. Morgan

(57) ABSTRACT

A power generating system, including a first shaft, a first compressor, a second compressor and a turbine. In a further embodiment, the system also includes a second turbine, a second shaft and a generator. Each of the first compressor, the second compressor and the turbine are connected to the first shaft whereby the first shaft, the first compressor, the second compressor and the turbine all rotate at the same speed. The first compressor and second compressor are of disparate flow types.

15 Claims, 5 Drawing Sheets

APPARATUS AND METHOD TO INCREASE TURBINE POWER

CROSS-REFERENCE TO RELATED APPLICATIONS

This application is related to and claims priority from provisional application Ser. No. 60/113,851 filed on Dec. 24, 1998, which is incorporated herein by reference and which is commonly assigned with the present application.

STATEMENT REGARDING FEDERALLY SPONSORED RESEARCH OR DEVELOPMENT

Not applicable.

REFERENCE TO A MICROFICHE APPENDIX

Not applicable.

BACKGROUND OF THE INVENTION

This invention relates generally to turbines, including microturbines, and more particularly to a method and apparatus to increase the power output of a turbine.

Microturbines are multi-fuel, modular distributed power generation units having multiple applications. They do not require the installation of expensive infrastructure to deliver power to end-users. Thus, in parts of the world lacking the transmission and distribution lines of a basic electric infrastructure, commercialization of microturbines will be an enabling application. In the United States and other countries already having a suitable electric infrastructure, distributed generation units allow consumers of electricity to choose the most cost-effective method of electric service. In many instances microtubrines may be more cost effective than grid power owing to such considerations as energy rates or transmission line losses. In addition to primary power generation, microturbines also offer an efficient way to supply back-up power or uninterruptible power. Other applications exist as well, such as the use of flare gas and landfill gas to generate power. They may also be used to remove harmful chemicals from air that becomes polluted as a result of a manufacturing process.

Current, state of the art, microturbine designs utilize low pressure ratio cycles (3–4 $Pr(P_{exit}/P_{inlet})$), and rely primarily on recuperation to increase thermodynamic efficiency. In order to increase the power of a microturbine beyond that which can be achieved with increased firing temperature (which, typically, results in a 10–15% increase in power, at the sacrifice of component life), the microturbine must be scaled to a larger aerodynamic flow size. However, scaling is costly, and, while providing additional power, does little if anything to increase system efficiency.

The use of supercharging, in conjunction with intercooling, is another method that may be used to increase power. U.S. Pat. No. 5,553,448 to Farrell, et al., discloses systems that include a low-pressure compressor, a high-pressure compressor downstream of the low-pressure compressor, a combustor, a high-pressure turbine downstream of the combustor, and a low-pressure turbine downstream of the high-pressure turbine. In what Farrell, et al., describe as the "standard configuration," systems of this type include dual concentric shafts, wherein the high pressure turbine drives the high pressure compressor via a first shaft and the low pressure turbine drives the low pressure compressor by a second shaft (which passes through the first shaft). Farrell, et al., purport to improve on this design by eliminating the dual concentric shafts and driving both the high pressure compressor and the low pressure compressor with the high speed turbine. The high-pressure compressor is driven directly; the low-pressure compressor via a speed-reducing gearbox. Farrell, et al., also incorporate an intercooler between the low pressure compressor and the high speed pressure compressor to reduce the power of the high pressure compressor by, approximately, the amount of power required to run the low pressure compressor.

Multiple compressor stages, such as described above, perform optimally (i.e., with the highest efficiency and mechanical integrity) when run at different shaft speeds. As is well understood in the art, the compression of the first stage squeezes the airflow, reducing the aerodynamically corrected flow (Wc) into the second stage, as given by the following relationship:

$$Wc = Wa(\sqrt{Tr_1})/Pr_1,$$

where Wc is the corrected flow at the exit of the first stage of compression, Wa is the actual physical flow, $Tr_1$ is the temperature ratio across the first stage of compression, and $Pr_1$ is the pressure ratio across the first stage of compression.

For a given flow size, the optimum shaft speed is determined using design conventions that are well understood in the field. As the ratio of corrected flows $W_1/W_2$ (in this case Wa/Wc) grows, the optimum shaft speeds for the two compressors becomes progressively dissimilar. Increasing the first stage pressure ratio makes this effect worse. Although increasing the first stage temperature ratio can help to reduce the dissimilarity between optimum shaft speeds by a small amount, a first stage temperature ratio increase also has the consequence of reducing the first stage thermodynamic efficiency, which reduces overall engine efficiency.

Intercooling increases power and offers the capability of increasing engine efficiency by reducing the temperature from the discharge of the first compression stage before the inlet to the second compression stage. This temperature reduction has, at least, three notable consequences. First, it reduces the cold side recuperator inlet temperature, allowing the recuperator to run cooler even at higher cycle pressure ratios. Second, the temperature reduction substantially increases the dissimilarity between optimum shaft speeds, which can necessitate the use of a gearbox or another mechanism to turn the first and second stage compressors at different speeds. Third, it reduces the work of compression. Thus, Farrell, et al., disclose the use of a gearbox between the first and second stages to reduce the shaft speed of the first stage relative to the second. Similarly, U.S. Pat. No. 4,896,499 to Rice discloses the use of a separate low pressure compressor-turbine spool concentrically positioned within a high pressure compressor-turbine spool, the two spools running at different speeds to allow the low pressure compressor to run slower than the high pressure compressor.

The types of arrangements shown in Farrell, et al., and Rice, and other examples of intercooled gas turbine power generation systems, involve the use of additional moving parts (e.g. concentric shafts, variable vane geometry, or gear boxes) and create disadvantageous complexities in coping with the dissimilarity between optimal first and second stage compressor shaft speeds. Such arrangements decrease system efficiency due to additional parasitic losses, such as leakage or friction.

It is therefore an object of the present invention to provide a method of increasing the power output and efficiency of a turbine power generating system without scaling, the use of concentric shafts, variable vane geometry, or gearboxes. More specifically, in the case of microturbines, the present invention is designed to allow a large increase in power (i.e., 3–10 times greater than an existing microturbine), while providing cycle efficiency improvements (i.e., 10%–15%) at a relatively low cost and without requiring scaling of such a microturbine.

It is an additional object of the invention to increase the power output and efficiency of a conventional microturbine power generating system while reducing the system's cost per unit power.

It is still another object of the invention to provide a method for improving a conventional turbine power generating system by integrating a supercharging compressor stage on the same shaft as the high-pressure compressor stage.

Another object of the invention is to provide a supercharging stage to a conventional turbine power generating system or a microturbine power generating system, by the addition of a low pressure compressor to the same shaft as the high pressure compressor, wherein the low pressure compressor and high pressure compressor are of dissimilar (unlike each other) flow types.

It is also an object of the invention to avoid mechanical limitations of compressor wheels by using a mixed flow compressor or, alternatively, an axial flow compressor, in a supercharging stage that is added to a turbine power generating system or microturbine power generating system that uses a centrifugal high pressure compressor stage.

Still another object of the invention is to improve a conventional microturbine by adding a supercharging stage and intercooling, using a minimal number of additional components.

The above objects of the invention are examples of objects only, and should not be construed to narrow the scope of the invention. Both the above-stated examples and other objects of the invention will be evident from the invention, as described and claimed below.

BRIEF SUMMARY OF THE INVENTION

To increase power in a turbine power generation system, a supercharging stage of compression followed by an intercooler is added to a conventional turbine power generation system. An additional spool consisting of a power turbine directly coupled to a generator is also added to extract power from the system. By utilizing the present invention, power from the conventional system can be increased dramatically (on the order of 3 to 10 times) and efficiency raised 10–15%, while cost per unit power substantially decreases. These advantages are best obtained in a cycle which is also recuperated.

Complexities typically associated with an intercooling stage, such as the use of a gear box or other mechanism to match the optimal shaft speeds of the low and high-pressure compressor shafts, are avoided by the use of dissimilar compressor types. In one embodiment, the low-pressure super-charging compressor is a mixed flow compressor and the high-pressure compressor is a centrifugal flow compressor. In another embodiment, the low-pressure compressor includes one or more axial flow compressors and the high-pressure compressor includes a centrifugal flow compressor.

Use of mixed flow or axial flow compressors in the low pressure compression stage also overcomes the mechanical limitations that would exist with centrifugal compressors, if such centrifugal compressors were used on the same shaft as a supercharging stage of a state-of-the art microturbine today. With intercooling, a centrifugal compressor would not be able to withstand the rotational speed required if it were to be integrated on the same shaft as the high-pressure compressor in a microturbine.

BRIEF DESCRIPTION OF DRAWINGS

The details and features of the present invention will be more clearly understood with respect to the detailed description and drawings, in which.

DETAILED DESCRIPTION OF THE INVENTION

Figure 1:
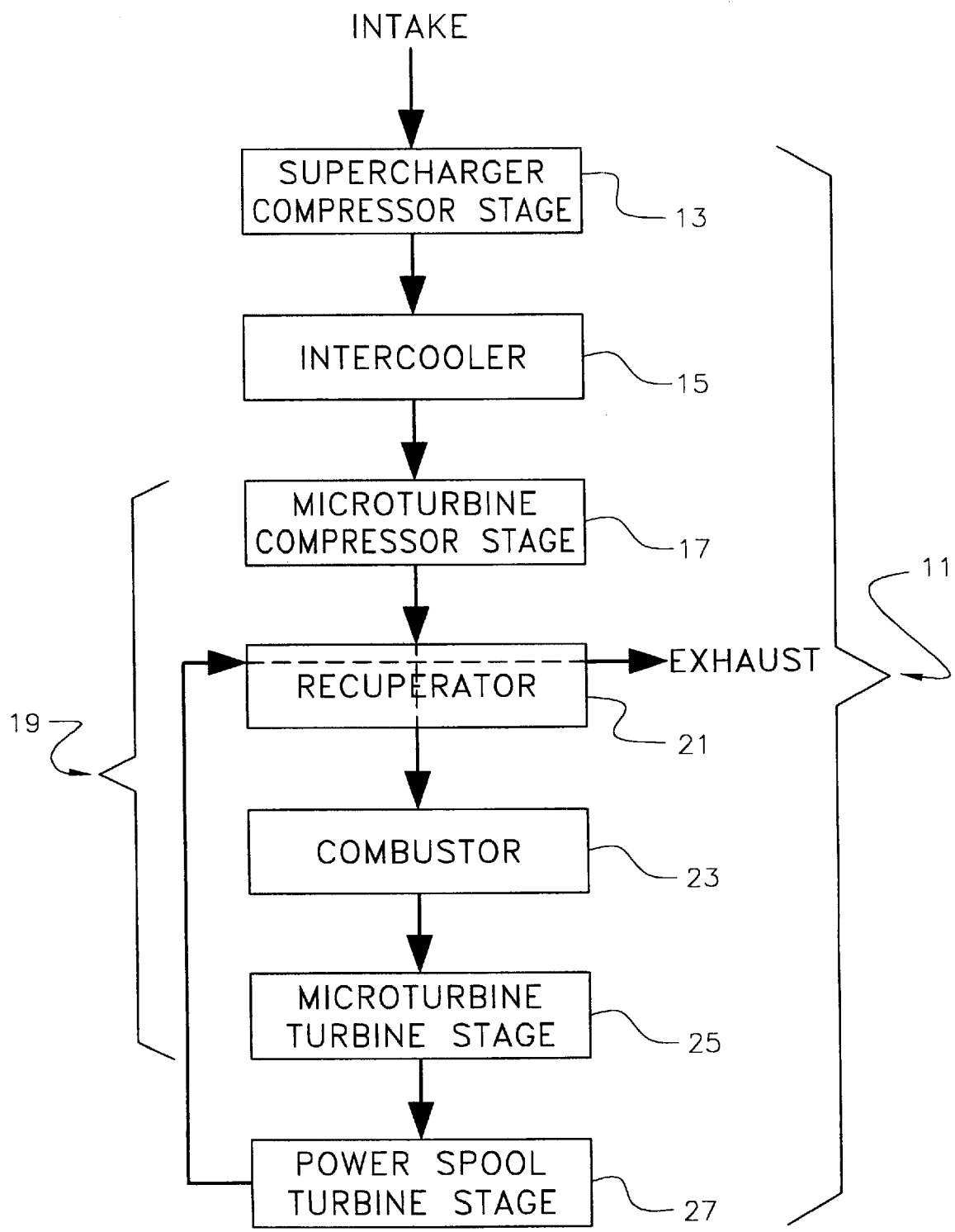
FIG. 1 is a block diagram depicting air flow through a microturbine power generation system constructed in accordance with the present invention.
Figure 2:
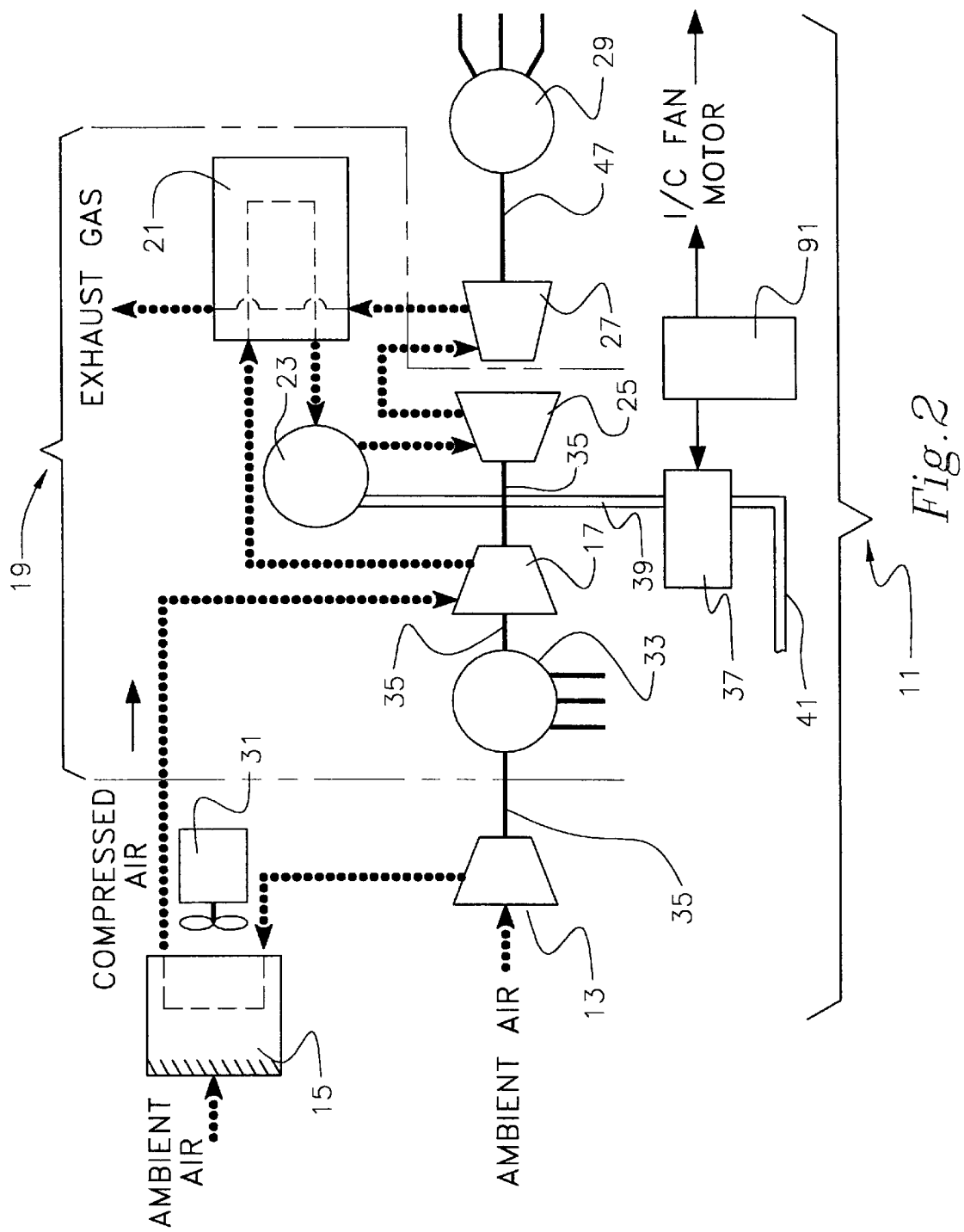
FIG. 2 is a schematic of the microturbine power generating system constructed in accordance with the present invention.

Referring to the embodiment depicted in FIGS. 1 and 2, the microturbine power generation system 11 intakes ambient air via a supercharging compressor stage 13. This supercharging compressor stage 13 increases engine airflow by approximately two to four times. Airflow to the microturbine compressor stage 17 needs to be the same, excluding insignificant losses due to any air leakage. Thus, if a 3:1 pressure ratio supercharging stage is used, and the exit flow matches the inlet of the microturbine compressor stage 17, three times the air is used as compared to a microturbine compressor stage not preceded by a supercharging compressor stage.

The compressed airflow is directed from supercharging compressor stage 13 to intercooler 15, where it is cooled to near ambient conditions. The cooled air then proceeds to the inlet (not shown) of compressor 17 of microturbine 19. The air is further compressed in compressor 17, then preheated in cold side passages (not shown) of a recuperator 21 with exhaust heat, and further heated in the combustor 23, where fuel is mixed with the air and the resulting fuel-air mixture combusted. The hot combustion gas is then expanded through a radial turbine 25. The gas then passes through the power spool turbine 27, which extracts work from the gas. The extracted work, in one embodiment, is transferred to an electrical machine 29 (e.g., a high-speed permanent magnet generator) where electricity is generated. The work could, alternately, be transferred into mechanical work via known means such as rotating components (e.g., a drive train), or via compressions means. After work is extracted, the hot gas then passes through hot side passages (also not shown) of recuperator 21 where the waste heat is extracted from the flow before it is exhausted to the atmosphere.

The interrelationship of the basic components of system 11 is illustrated in FIG. 2. The airflow is the same as illustrated in FIG. 1. As is well understood, intercooler 15 typically includes a fan and motor 31. In the depicted embodiment, microturbine 19 also includes a starter motor 33. In this embodiment, starter motor 33, compressor 17 and turbine 25 are all mounted on the same shaft 35. In accordance with the present invention, supercharging compressor 13 is also mounted to shaft 35, so that each revolution of turbine 25 produces a like revolution in compressor 17, motor 33 and supercharging compressor 13. The depicted microturbine 19 also includes a fuel valve 37, a fuel line 39 connecting valve 37 with combustor 23, and a fuel line 41 (which connects to the source of fuel).

We have discovered that the use of dissimilar compressor types for supercharging compressor 13 and compressor 17 enables the direct coupling of supercharging compressor 13 to shaft 35, without an intermediate speed reducing gear box. The present invention overcomes the problems associated with intercooling a gas turbine engine by utilizing a first stage (supercharging) compressor having a mixed flow configuration and the second stage compressor 17 having a centrifugal configuration so that both compressors run on the same shaft at the same speed. Preferably supercharging compressor 13 is a high efficiency transonic mixed-flow compressor of the type disclosed in U.S. Pat. No. 4,678,398 to Dodge, et al., the disclosure of which is incorporated by reference, although other mixed flow compressors may be used.

The design of Dodge, et al., is advantageous because it best matches the specific speeds of the compressor types. Specific speed can be expressed by the relation:

$$N_s = N(Q/(H)^{0.75}),$$

wherein $N_s$ is the specific speed; N the rpm of the shaft; Q the inlet volume flow/exit volume flow; and $(H)^{0.75}$, the enthalpy of compression, equals Cp (T) BTU/lbm, wherein T is the temperature rise ($T_{exit}-T_{inlet}$) and Cp the specific heat.

Figure 3:
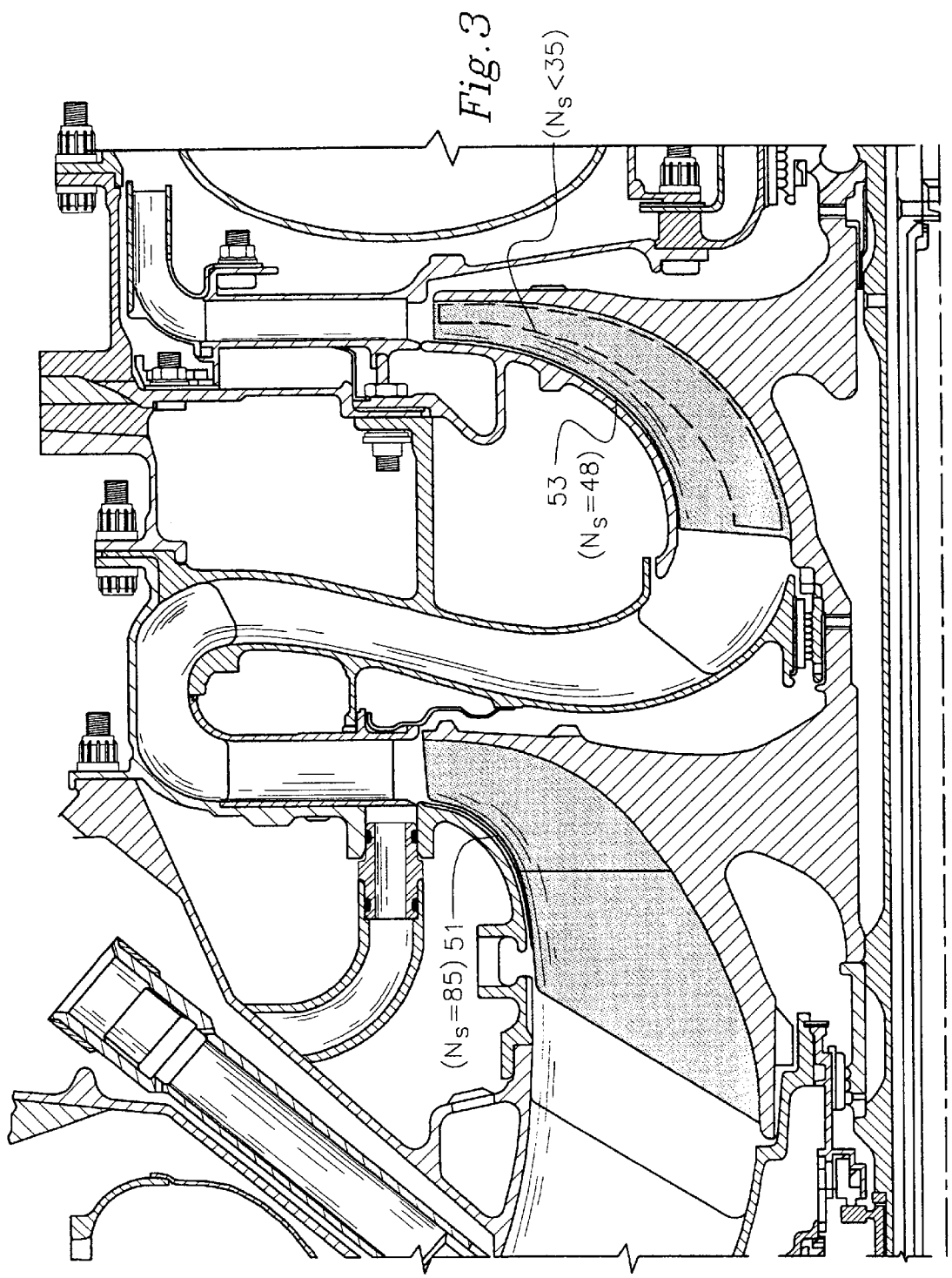
FIG. 3 is a partial cross-section of a two stage centrifugal compressor.

There are many applications in which two centrifugal compressor stages are run in tandem on the same shaft to obtain pressure ratios in the 9:1 to 13:1 range. The forward stage is driven to a higher than optimum specific speed which translates to larger than desired inlet and exit areas. Conversely, the aft stage is driven to a lower than desired specific speed which translates to smaller than desired inlet and exit areas. This effect on geometry is shown in FIG. 3. This divergence in specific speed, and resulting effect on blading geometry, limits the practical pressure ratio that can be achieved. Specifically, the blading 51 (shaded) in the forward stage has a less than desired radius change in the tip, and the blading 53 (shaded) in the aft stage has small blade passages and a long meridional flow length which exacerbate friction and clearance losses. As illustrated, $N_s$ (forward stage)=85 and $N_s$ (aft stage)=48. If an intercooler is inserted between the two stages the specific speeds become even more disparate and the ability to have two centrifugal stages on a single shaft becomes impractical. Ns (aft stage) drops to approximately 35 as indicated by the dashed area in FIG. 3.

Figure 4:
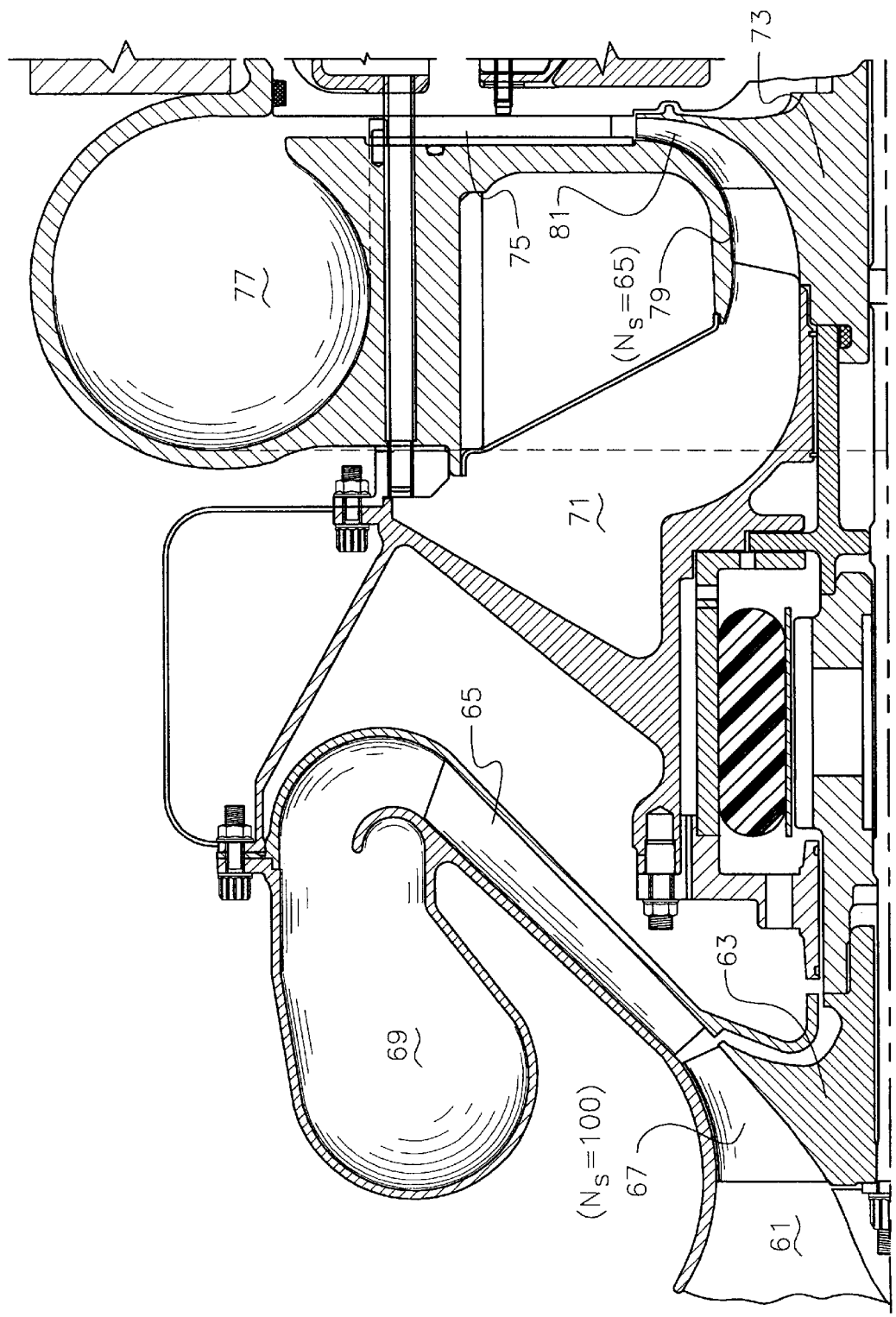
FIG. 4 is a partial cross-section of a mixed flow compressor/centrifugal compressor, with intercooling.

The mixed flow stage of Dodge, et al., optimizes at a much higher specific speed, which allows both supercharging compressor stage 13 and centrifugal stage 17 to run at near optimum specific speeds, even when intercooled, without the adverse geometric effects. With reference to FIG. 4, mixed flow compressor of supercharging compressor stage 13 includes an inlet 61, disk 63, a diffusion section 65, and a scroll 69. Disk 63 includes a plurality of blades 67. Scroll 69 is ducted to intercooler 15. Centrifugal compressor of microturbine compressor stage 17 includes plenum 71, disk 73, diffuser 75 and scroll 77. Plenum 71 receives air from intercooler 15. Disk 73 includes blades 79 and splitter blades 81. Scroll 77 is connected to recuperator 21. Ideal specific speeds are 65 for the centrifugal compressor and 100 for the mixed flow compressor. The supercharging compressor stage 13 depicted in FIG. 4 also has the appropriate optimal pressure ratio of 3:1 to supercharge the intercooled centrifugal microturbine compressor stage 17 with a single stage. The exit of supercharging compressor stage 13 in the depicted embodiment is somewhat outboard, which facilitates collection in scroll 69 for ducting to intercooler 15. As used herein, the term "duct" refers to a channel, scroll, diffuser, pipe, or tube, and includes known systems for directing air or gas flow or allowing the passage of air or gas through a power generating system. "Ducting" means a duct or system of ducts.

Use of axial stages (not shown), which have even higher specific speeds than mixed flow compressors, can be utilized in place of a mixed flow compressor. However, the attainable pressure ratio per stage is relatively small, for instance about 1.5:1. This means that three axial compressor stages, which have many more parts per stage than the other compressor types, would be required. This could increase the cost and complexity beyond what would normally be practical for microturbines. The exit of the axial stages is also axial and must be turned outboard for collection into a scroll. This adversely impacts rotor length, which makes the mechanical arrangement of the shafting less practical than with the use of a mixed flow compressor. Nevertheless, many of the advantages of using a centrifugal second stage compressor with a non-centrifugal first stage compressor in a power generating system can still be attained when the non-centrifugal first stage compressor uses one or more axial compressors.

In one embodiment of the present invention, microturbine 19 is conveniently a modification of a microturbine such as one now being commercialized by Honeywell Power Systems Inc. under the brand name Parallon™ 75. In this embodiment, the original radial turbine 25 of the Parallon™ 75 now drives supercharging compressor 13 as well as the original microturbine compressor 17. The electrical starter/generator on and around the original microturbine shaft 35 is replaced by starter motor 33 and the larger electrical generator 29 is mounted on and around the added shaft 47. Intercooler 15 drops the temperature between the stages of compression (13 and 17) by about 150 to 200 degrees F. (65.6 to 93.3 degrees Celcius), reducing by approximately 25% the power required to compress the air and enabling original single stage radial turbine 25 to have sufficient power to drive both compression stages, without requiring additional stages.

Figure 5:
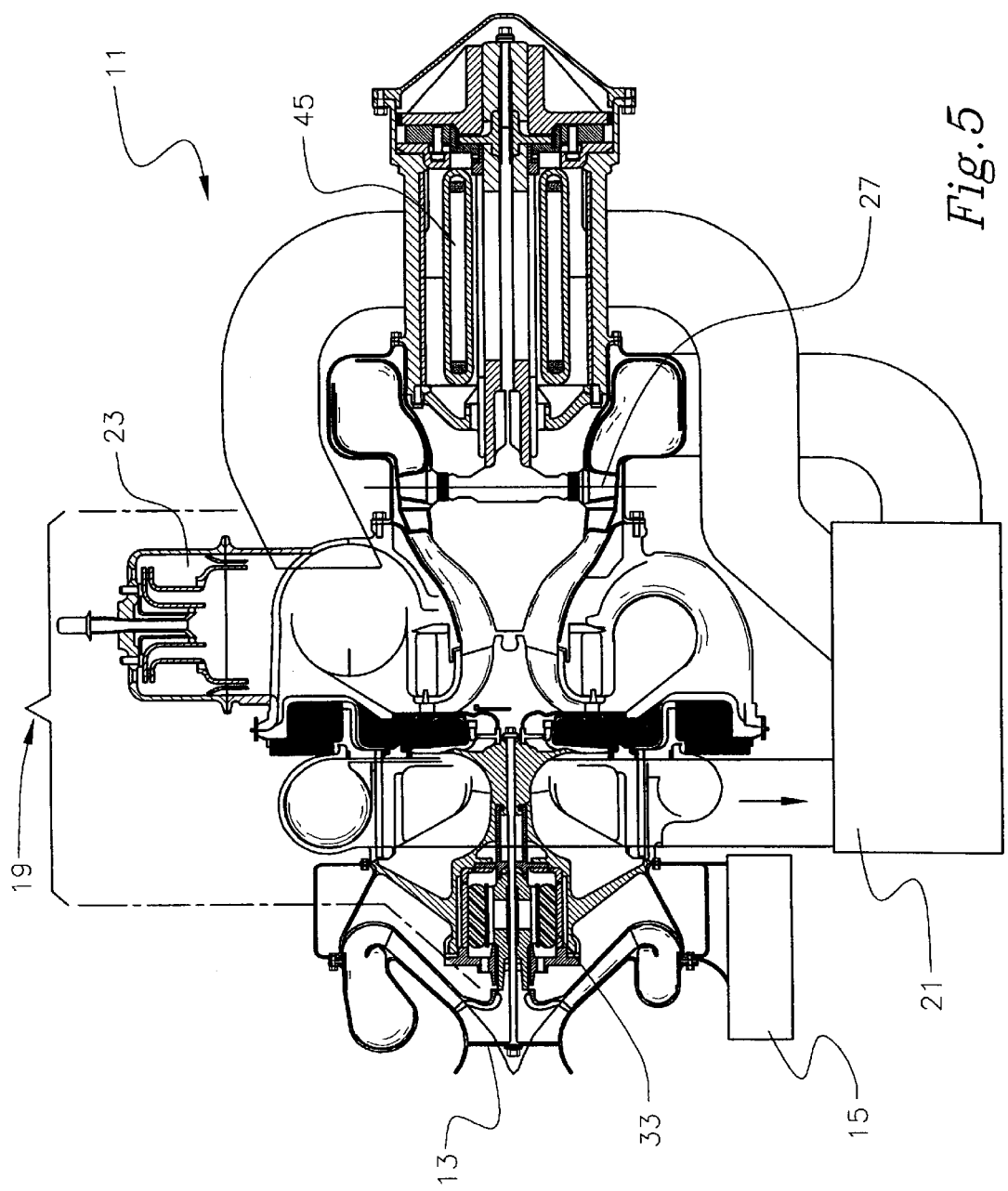
FIG. 5 is a partially cut-away, partially schematic side view of a microturbine power generation system constructed in accordance with the present invention.

Power turbine 27, which is either axial, radial or mixed flow, is coupled to the rotating portion of generator 29 via shaft 47. Turbine 27 is coupled to microturbine 19 via suitable ducting, an example of which is illustrated in FIG. 5.

The generator 29 can be a ring-wound, two-pole toothless (TPTL) brushless permanent magnet electric machine having a permanent magnet rotor and stator windings, or other suitable magnet electric machine having a permanent magnet rotor and stator. The rotor is rotatable relative to the stator windings. The shaft power generated by the rotating power turbine 27 is used to rotate the rotor, which is attached to shaft 47. When the rotor is rotated by the turbine power, an alternating current is induced in the stator windings. Note that, while we refer herein to an electrical generator being mounted on and around a rotatable shaft, it is understood that only the rotating portion of the electrical generator is actually mounted on the rotatable shaft.

The speed of the turbine 27 can be varied in accordance with external energy demands placed on system 11. Variations in the speed of shaft 47 will produce a variation in the frequency (i.e., wild frequencies) of the alternating current generated by the electrical generator 29. Regardless of the frequency of the ac power generated by electrical generator 29, the ac power can be rectified to dc power and then inverted by a rectifier/inverter (not shown) to produce ac power having the desired fixed frequency and quality.

Accordingly, when less power is required, the turbine speed can be reduced without affecting the frequency of the ac output.

System 11 also includes an electrical control unit 91, a variety of conventional temperature and pressure sensors, an inverter/rectifier, an electronic engine control, wiring harnesses, enclosure, bleed valves, insulation, and a control panel. For the purposes of this invention, these components may be chosen from a variety of conventional components of this nature; therefore they are not illustrated. As those skilled in the art will also appreciate, system 11 can beneficially include a gas bearing circuit. For instance, in one embodiment, shafts 35 and 47 are positioned at least partially within air journal bearings (also known as gas bearings) for support in the radial direction. The shafts 35 and 47 are also supported axially in such an embodiment by air thrust bearings. System 11 may also include a gas compressor loop, if low-pressure natural gas is used. A cooling loop may also be included for generator 29.

While state of the art microturbines utilize centrifugal compressors in single compression stage cycles and therefore have no supercharging stage, the present invention also provides a solution to a mechanical barrier that a supercharging stage would otherwise present in microturbine construction and operation. In a typical microturbine, the pressure ratio of single-stage compressed air to intake air is typically in the 3–5 range. If a conventional centrifugal compressor were to be used for a supercharging stage in such a microturbine, the wheel speed at the discharge of the rotor would have to be substantially greater than the wheel tip speed of the high pressure compressor. Such speed would be excessively high and would undoubtedly cause mechanical failure of the compressor.

The present invention provides a method and construction for the successful integration of a supercharging compressor onto the shaft of a conventional microturbine (which includes a single compressor stage, a single turbine stage, a permanent magnet rotor, and a single shaft that fixes each of the compressor, turbine and rotor relative to one another), and avoids mechanical failure of the supercharging compressor wheel. This is because, as stated, the first stage compressor of the present invention is a mixed flow compressor or, alternatively, an axial flow compressor. Such compressors have a shortened exit blade height relative to centrifugal compressors, and thereby maintain a wheel tip speed in operation that is within the mechanical limits of the compressor.

Whereas the drawings and accompanying description have shown and described the preferred embodiment of the present invention, it should be apparent to those skilled in the art that various changes may be made in the form of the invention without affecting the scope thereof.

We claim:

1. A power generator system, said system comprising:
   a first shaft,
   a first compressor selected from the group consisting of mixed flow compressors and axial flow compressors,
   a second compressor, said second compressor being a centrifugal compressor, said second compressor being downstream of said first compressor; a turbine;
   first ducting interconnecting said first and second compressors;
   an intercooler, said intercooler being connected to said first and second compressors by said first ducting, and
   second ducting interconnecting said second compressor with said turbine, each of said first compressor, said second compressor and said turbine being connected to said first shaft whereby said first shaft, said first compressor, said second compressor and said turbine all rotate at the same speed, said second compressor having a higher pressure ratio than said first compressor.

2. The power generating system of claim 1, wherein said first compressor is a mixed flow compressor.

3. The power generating system of claim 2, wherein said second ducting includes a heat exchanger, said heat exchanger comprising a cold side flow path through which combustion air from said second compressor flows and a hot side flow path through which exhaust gas flows, at least a portion of the cold side flow path being adjacent to and thermally coupled with the hot side flow path.

4. The power generating system of claim 3, wherein said second ducting also includes a combustor.

5. The power generating system of claim 2, further including a starter motor connected to said first shaft.

6. The power generating system of claim 2, further including a second shaft, a second turbine connected to said second shaft, and ducting interconnecting said first and second turbines whereby said second turbine is driven by exhaust gas exiting said first turbine.

7. The power generating system of claim 6, further including an electrical power generator having a rotating portion and a non-rotating portion, said rotating portion being coupled to said second shaft.

8. The power generating system of claim 6, wherein said second ducting includes a heat exchanger, said heat exchanger comprising a cold side flow path through which combustion air from said second compressor flows and a hot side flow path through which exhaust gas flows, at least a portion of the cold side flow path being adjacent to and thermally coupled with the hot side flow path.

9. A power generating system, said system comprising:
   a first shaft.
   a first compressor, said first compressor being a mixed flow compressor,
   a second compressor downstream of said first compressor, said second compressor being a centrifugal compressor;
   a turbine;
   first ducting interconnecting said first and second compressors, said first ducting including an intercooler; and
   second ducting interconnecting said second compressor with said turbine, each of said first compressor, said second compressor and said turbine being connected to said first shaft whereby said first shaft said first compressor, said second compressor and said turbine all rotate at the same speed.

10. The power generating system of claim 9, wherein said second ducting includes a heat exchanger, said heat exchanger comprising a cold side flow path through which combustion air from said second compressor flows and a hot side flow path through which exhaust gas flows, at least a portion of the cold side flow path being adjacent to and thermally coupled with the hot side flow path.

11. A method of generating electrical power from fuel, comprising the steps of
   (a) rotating a shaft;
   (b) using a non-centrifugal first compressor, mounted on the shaft, to compress combustion air;
   (c) providing an intercooler;
   (d) ducting the compressed combustion air to the intercooler;

(e) removing some heat from the compressed combustion air in the intercooler;

(f) providing a centrifugal second compressor, also mounted on the shaft;

(g) ducting the compressed combustion air from the intercooler to the second compressor;

(h) using said second compressor to further compress the combustion air;

(i) providing a combustor;

(j) ducting the further compressed combustion air to the combustor, (k) supplying fuel to the combustor;

(l) mixing the fuel and the further compressed combustion air to create an air-fuel mixture;

(m) igniting the air-fuel mixture to create expanding gas;

(n) providing a turbine, also mounted on the shaft;

(o) passing the expanding gas through the turbine, (p) continuing to supply fuel and combustion air to the combustor, thereby sustaining rotation of the turbine, the shaft, the first compressor, and the second compressor at the same speed;

(q) adjusting the supply of fuel so that the expanding gas contains sufficient initial expansion energy to sustain the rotation of the turbine, the shaft, the first compressor and the second compressor, and still retain secondary expansion energy; and (r) a step for converting at least a portion of the secondary expansion energy into electrical energy.

12. The method of generating electrical power from fuel of claim 11, wherein the non-centrifugal first compressor is a mixed-flow compressors.

13. The method of generating electrical power from fuel of claim 12, wherein step (r) includes the steps of:

(r1) providing a second shaft, a second turbine, and an electrical generator having a rotatable portion and a non-rotatable portion, the second turbine and the rotatable portion of the electrical generator being mounted on the second shaft;

(r2) using the secondary expansion energy to rotate the second turbine, thereby causing the second shaft and the rotatable portion of the electrical generator to rotate; and (r3) inducing an alternating current in the non-rotatable portion of the electrical generator.

14. The method of generating electrical power from fuel of claim 12, further including, just prior to step (j), the step of passing the further compressed combustion air through a heat exchanger.

15. The method of generating electrical power from fuel of claim 13, further including, just prior to step (j), the step of passing the further compressed combustion air through a heat exchanger.

* * * * *